(12) United States Patent
Lindbergh

(10) Patent No.: US 8,773,498 B2
(45) Date of Patent: Jul. 8, 2014

(54) BACKGROUND COMPRESSION AND RESOLUTION ENHANCEMENT TECHNIQUE FOR VIDEO TELEPHONY AND VIDEO CONFERENCING

(75) Inventor: David Jordan Lindbergh, Reading, MA (US)

(73) Assignee: Polycom, Inc., San Jose, CA (US)

( * ) Notice: Subject to any disclaimer, the term of this patent is extended or adjusted under 35 U.S.C. 154(b) by 234 days.

(21) Appl. No.: 13/250,487

(22) Filed: Sep. 30, 2011

(65) Prior Publication Data

US 2013/0083153 A1  Apr. 4, 2013

(51) Int. Cl.
*H04N 7/14* (2006.01)

(52) U.S. Cl.
USPC ..................................... 348/14.13; 348/14.08

(58) Field of Classification Search
USPC ..................... 348/14.01, 14.08, 14.12, 14.13
See application file for complete search history.

(56) References Cited

U.S. PATENT DOCUMENTS

2002/0113862 A1 * 8/2002 Center et al. ............... 348/14.08
2003/0052962 A1 * 3/2003 Wilk .......................... 348/14.01

FOREIGN PATENT DOCUMENTS

WO    WO 2010141023 A1 * 12/2010

* cited by examiner

*Primary Examiner* — Quoc D Tran
(74) *Attorney, Agent, or Firm* — Wong, Cabello, Lutsch, Rutherford & Brucculeri, L.L.P.

(57) ABSTRACT

An image processing system processes images such that a proportion of area of regions of interest within the image can be increased at the expense of regions of lesser interest. First, regions of interest, such as portions of the image including participants, are determined. Then compressible background regions are determined and compressed. This results in the proportion of the area of the regions of interest to increase. After the image is stored or transmitted, the regions of interest can be seen more clearly both because they are larger and because any loss of detail caused by down-sampling or lossy image compression needed to limit the amount of image information is reduced due to the smaller image size. The process also preserves more of the relative spatial relationship between various regions of interest than prior methods.

38 Claims, 12 Drawing Sheets

BACKGROUND COMPRESSION AND RESOLUTION ENHANCEMENT TECHNIQUE FOR VIDEO TELEPHONY AND VIDEO CONFERENCING

FIELD OF THE INVENTION

The present invention relates generally to communication systems, and more particularly to video conferencing and video telephony.

BACKGROUND

Clarity of an image presented to a videoconferencing participant is an important aspect of videoconferencing and video-telephony systems. Attainment of sufficient clarity is particularly challenging in group videoconferencing applications, in which more than one participant is present at one or both ends of the videoconferencing session. In such cases, a camera that is used to capture the participants is typically zoomed out so that the camera can capture all the participants of the group. However, zooming out diminishes the sizes of the participants as they appear in the captured image. In other words, the number of pixels dedicated to each of the most interesting parts—the participants or other regions of interest (ROI)—are reduced. As a result, when the image is sent to the far end, the images of participants within the image are less clearly seen by the far end participants.

For example, FIG. 1 shows a captured image 101 of a conference room. An image captured by a typical camera has only a finite number of pixels, and therefore finite resolution. The camera capturing the image 101 has been zoomed out in order to include the entire area of the conference room where conference participants are likely to sit, although the three actual participants 102-104 occupy only the center region of the captured image. Most of the area in the image 101 is occupied by objects that are not interesting or necessary as far as a specific videoconference with participants 102-104 is concerned. The interesting portions of the image 101 are the faces and torsos of conference participants, e.g., 102, 103, and 104. Thus, the number of pixels capturing the ROI—the conference participants—is considerably less than the pixels capturing non-interesting regions of the image 101. When image 101 is shown to the far end participants in a typical videoconference according to prior art, the far end participants can see the images of participants 102-104 with limited clarity, because (a) the number of pixels in the image 101 is finite, (b) the videoconferencing system will typically reduce the number of pixels by down-sampling prior to transmission in order to reduce the bandwidth and computational resources required by the system, (c) the video encoding algorithms typically used are lossy, and will produce a decoded picture with less detail than the originally transmitted picture, and (d) the image displayed to the far-end participants is of finite size—therefore the image of each person may be so small that human visual acuity is able to resolve only a portion of the displayed details.

To elaborate, transmitting the image 101 to the far end can have further adverse impact on clarity. For example, compression, down-sampling, etc. may be carried out on an image to be transmitted to the far end in order to meet transmission bandwidth limits. FIG. 2 shows FIG. 1 down-sampled to QCIF resolution (176×144 pixels) for transmission to the far end. Down-sampling reduces the number of pixels for each participant to an even lower number than captured in the original image.

One traditional solution is to use multiple cameras, where each camera captures only the face/torso of one participant, and to combine the individual captured images in a so-called "Hollywood Squares" fashion to form a composite image, as shown in FIG. 3. Thus, majority of pixels of image 106 are dedicated to the images of the participants. The regions of image 101 that contained less interesting objects and features are desirably absent from image 106. Yet, while the faces of individual participants are clear, the actual spatial relationship between the participants is lost by the arrangement in image 102. For example, when participants 102 and 103 turn their heads to make eye contact with each other, the resultant motion in image 106 will appear with participant 102 turning to his left and participant 103 turning to his right. Because the image of participant 104 is to the left of the image of participant 102, it will seem as if participant 102 is turning to converse with participant 104, instead of participant 103. This can be very disorienting to the far end participants who are unaware of the relative positions of the near end participants.

Thus, it is desirable to have a technique that not only provides clearer images of the interesting regions of a captured image, but also maintains relative spatial arrangements of local participants in the captured image.

SUMMARY

A videoconferencing unit processes an input image to produce an output image such that the proportion of image area occupied by ROI in the input image is increased in the output image. First, ROI such as portions of the image including participants, are determined. Then background regions are determined and reduced in area. This results in the proportion of the area of the ROI to increase compared to their proportions in the original image. Whether the image is stored and retrieved or transmitted to a far end display, the ROI can be seen more clearly despite down-sampling, lossy compression, and limited display resolution and size. The process also preserves relative spatial relationship between various ROI.

The image can also be cropped before the background regions are determined, in order to produce an intermediate image containing the ROI but as little as possible of the less interesting areas of the input image. Cropping can be carried out as a function of the target aspect ratio of the image. Alternatively, a pan-tilt-zoom camera can be controlled to zoom in such that the ROI occupy the maximum possible area of the image frame without being cut off.

The ROI and the background regions can be of various shapes and sizes. In one example, the ROI and the background regions can be rectangular in shape. The background regions can include rectangular vertical and horizontal regions that cover as much area of the image as possible without including any portion of the ROI. The background regions can be compressed by employing linear or non-linear compression. The degree of compression can also be adjusted in order to maintain the desired aspect ratio of the final image.

In one example, the image processing system can transmit or store information regarding the location and process used to perform the compression of the background regions. This information can be used upon receipt or retrieval to decompress the compressed background regions and reproduce the original image, but with more detail in the uncompressed regions than would have been present if traditional techniques were used.

BRIEF DESCRIPTION OF THE DRAWINGS

Exemplary embodiments of the present invention will be more readily understood from reading the following description and by reference to the accompanying drawings, in which.

DETAILED DESCRIPTION

Figure 4:
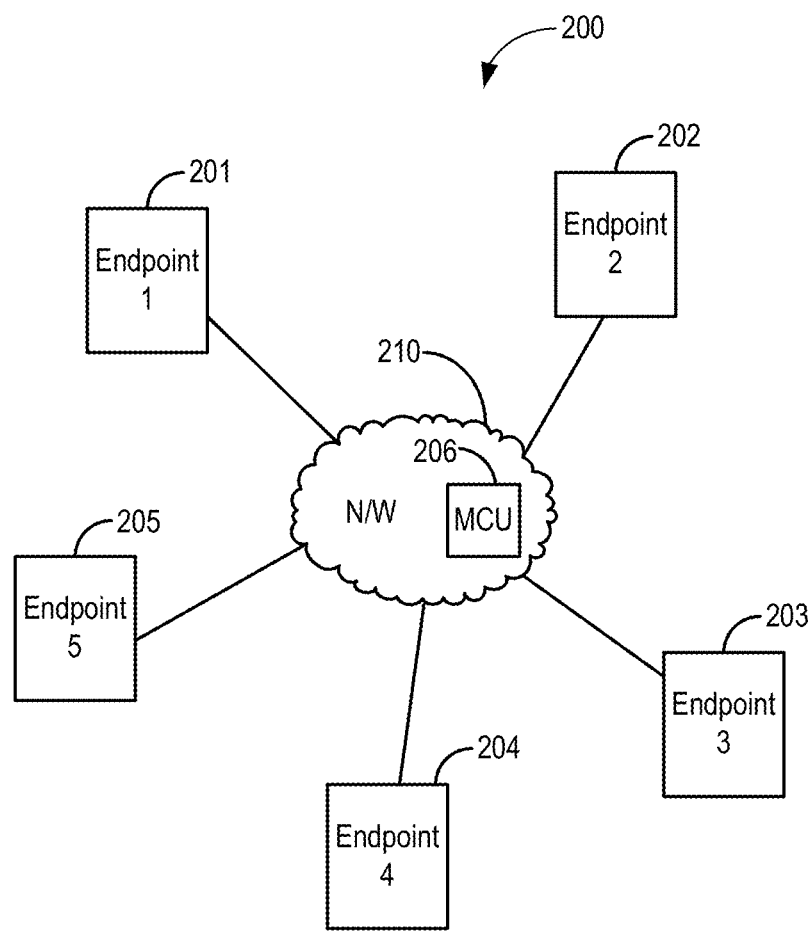
FIG. 4 depicts an exemplary videoconferencing system including a plurality of videoconferencing endpoints communicating over a network.

FIG. 4 shows a system 200 including a number of endpoints, namely Endpoint 1 (EP 1) 201-Endpoint 5 (EP 5) 205, which can communicate with each other over network 110. Endpoints EP1-EP5 201-205 may be situated at various geographical locations. In one example, endpoints EP 1-EP 5 201-205 can be situated at various locations within a company or organization. For example, the endpoints can be situated in conference rooms, offices, desktops of users/employees, etc. The company or organization may be housed in a single building or may be spread across multiple buildings in one or more cities, states, or countries. The endpoints can also be mobile. Network 110 can be a circuit switched network, a packet switched network, or a combination of the two. Network 110 can have a physical layer that is wired, wireless, or a combination of the two. Examples of network 110 are IP network, Ethernet, ATM, SONET, Fibre Channel, etc. A multipoint control unit (MCU) 206 can provide videoconferencing between more than two participants.

Figure 1:
FIG. 1 discloses an exemplary image of videoconference participants.
Figure 2:
FIG. 2 shows low resolution down-sampled image of FIG. 1.
Figure 5A:
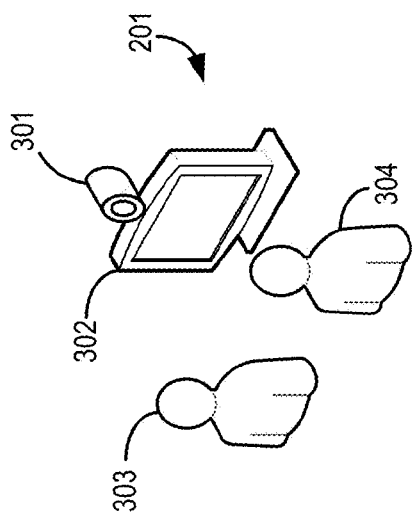
FIGS. 5A and 5B illustrate an exemplary endpoint and its functional block diagram.

FIG. 5A shows an exemplary videoconferencing endpoint 1 201 for providing videoconferencing to near end participants 303 and 304. Participants 303 and 304 can include participants 102-104 shown in FIG. 1. Endpoint 1 201 can be a personal desktop videoconferencing system (e.g., POLYCOM® HDX® 4000 Series), a conference room videoconferencing system (e.g., POLYCOM® HDX® 9000 Series), an immersive telepresence videoconferencing system (e.g., POLYCOM® RealPresence™ Experience (RPX) Series), a personal digital assistant or mobile-phone (e.g., APPLE® IPHONE4®, IPAD®), a desktop, laptop, or handheld computer running a videoconferencing application (e.g., POLYCOM® CMA™ Desktop), etc.

Figure 5B:
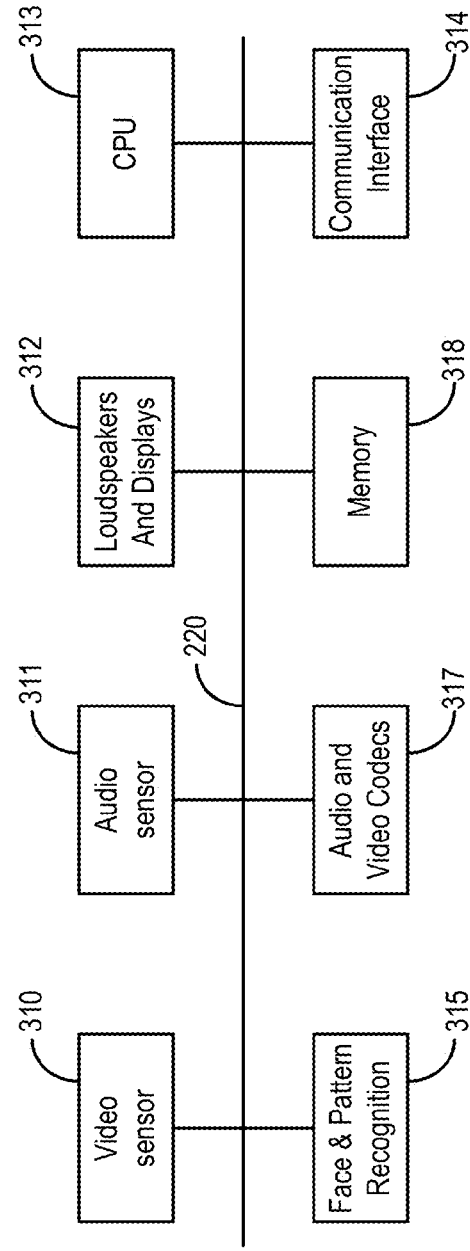

FIG. 5B shows and exemplary block diagram of each of the endpoints 201 thru 205. Each endpoint can include a video sensor 310, which can include a camera 301, or any other image capturing device. Camera 301 may capture images in two-dimensions (2D) as well as three-dimensions (3D). While only a single camera 301 is shown, video sensor 310 can include more than one camera. An audio sensor 311 can include one or more microphones for capturing the voice and sound of one or more users. Loudspeakers and displays 312 can reproduce audio and video signals representing voice and image of one or more far end participants. CPU 313 can include one or more microcontrollers, digital signal processors (DSPs), multi-core processors etc. Communication interface 314 can include a network interface, wireless interface, Ethernet interface, etc. for sending and receiving communication signals to and from the network 110, or directly to another videoconferencing system. Memory 318 can be volatile memory such as RAM, DRAM, SRAM, etc. and non-volatile memory such as FLASH memory, hard disk drive, etc. Audio and video codecs 317 can include audio and video compression hardware, software or a combination of hardware and software. Audio codecs can include, but are not limited to, G.711, G.729, G.723, G.726, G.728, etc. Video codecs can include, but are not limited to, H.263, H.264, etc. Face and Pattern recognition module 315 can include hardware and/or software for recognizing faces and other objects of interest within an image captured by the video sensor 310. Face and patter recognition module 315 can be an independent hardware/software module coupled with the CPU 313. In another example, the CPU 313 can be programmed to perform all of the functions of the module 315. Memory 218 and data storage 216 can also store software applications, program instructions, and data to be executed on the endpoint 101 and in particular on CPU 213.

Figure 6:
FIG. 6 shows an example of determined ROI within the image of FIG. 1.

FIG. 6 shows an example of determined ROIs in an image. Image 101 includes participants 102, 103, and 104 in addition to various other objects of the conference room in the foreground and the background. The portions of the image 101 that include at least a portion of any one of the participants can be considered as a region of interest. One way of determining a region of interest in any image, and particularly in image 101, is by using pattern recognition algorithms. The pattern recognition module 315 can be programmed to detect eyes, faces, and/or torsos of people appearing within the image 101. The pattern recognition module 315 or the CPU 213 can be further programmed to select an area around the detected face of a participant as the ROI. The shape and size of the selected area can be chosen such that the selected area substantially includes the face and torso of the participant. In one example, the shape of the region of interest can be a rectangle with an aspect ratio (width:height) of 2:3, where the width can be approximately seven times the inter-ocular distance (the distance between the two eyes seen head-on). The rectangular region of interest can be positioned on the image 101 such that the face of the participant is centered vertically in the upper ⅔rds or upper half of the height of the rectangle. FIG. 6 shows three such rectangular ROI 402, 403 and 404 corresponding to participants 102, 103, and 104, respectively.

Of course, the ROI can have a shape and size that is different from the ones shown in FIG. 6. For example, one or more ROI can be oval, triangular, etc. The shape of one or more regions can also be irregular, for example, conforming to shape of the object of interest.

In another example, the ROI may include objects other than the participants. Such objects may include, for example, a writing board, a display screen, labels displaying names of the participants, company logos, objects being discussed such as samples or prototypes, works of art, etc.

In yet another example, one or more ROI may be selected by the near end participants. This can be accomplished by displaying the image 101 to the local participants on display 312, and allowing the user to select areas on the image 101 with the aid of a graphical user interface. ROI may be selected by the far end participants using a graphical user interface as well. Information on the selected ROI can be received by the CPU 313 via communication interface 314. The information can include shapes, sizes, and location of the ROI in the original image.

Figure 7:
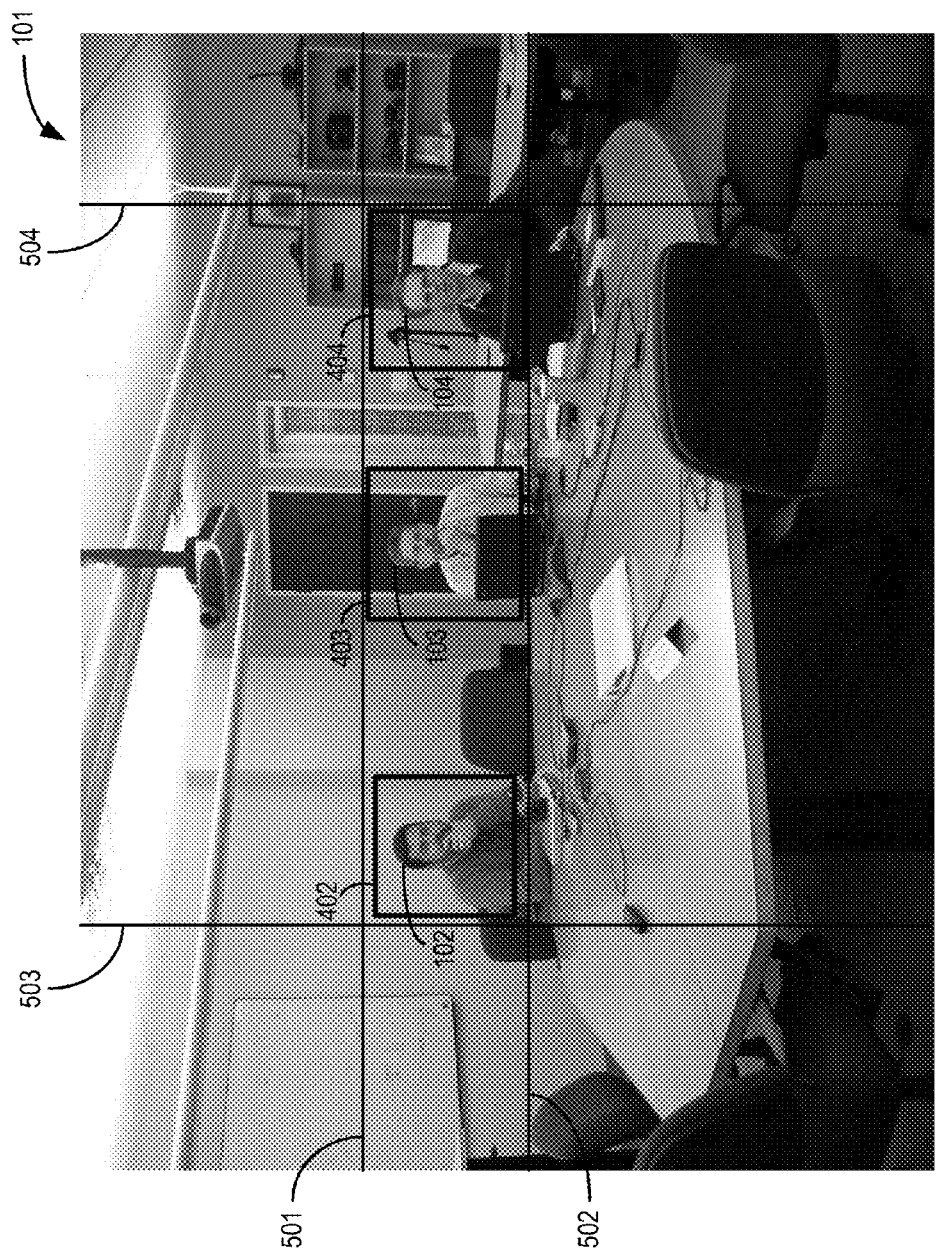
FIG. 7 illustrates in exemplary intermediate step in cropping the image of FIG. 6.

Once the ROI have been determined, the CPU 313 can be programmed to manipulate the image 101 such that the proportion of the output image area representing interesting portions of the input image 101 to the area representing non-interesting portions of the input image 101 is improved (i.e., increased). One way of increasing the proportion of the area of ROI is to crop away the portions of the image that are outside the region of interest while maintaining the aspect ratio of the intended transmitted image. For example, FIG. 7 shows the topmost, bottommost, rightmost, and leftmost boundaries of the ROI in image 101. The topmost boundary is denoted by line 501, the bottommost boundary is denoted by line 502, the leftmost boundary is denoted by line 503, and the rightmost boundary is denoted by line 504. While boundaries 501-504 are shown to be straight lines, they are not limited to being so. The boundaries can be composed of curves, line segments, or a combination thereof. They can also be fuzzy, wherein different regions are associated with varying degrees of interest.

Boundaries 501-504 form a rectangular region that includes all the ROI 402, 403, and 404 encompassing participants 102, 103, and 104 respectively. Image 101 can be cropped to the rectangular region. We can denote the bottom left corner of the rectangle having pixel coordinates [i,j] and the top right corner of the rectangle having pixel coordinates [k,l] (where i and k are pixel rows, and j and l are pixel columns). Then assuming that the aspect ratio of the transmitted image is AR, image 101 can be cropped along the perimeter of a rectangle having bottom left pixel coordinates as: [(k+i)/2−(l−j)/2*AR, j], and the top right pixel coordinates as: [(k+i)/2+(l−j)/2*AR, j]. In other words, the image is cropped to the width of the rectangle, and the height is adjusted based on the aspect ratio to center the ROI vertically.

Figure 8:
FIG. 8 shows an exemplary cropped image of FIG. 6.

FIG. 8 shows an example of a cropped image 107 resulting from the original image 101. In this example, the aspect ratio of the image was chosen as 4:3. Of course, a different aspect ratio will result in a different shaped image.

While the rectangle encompassing the ROI 402-404 in FIG. 6 was wide with respect to the aspect ratio, the ROI may be vertically oriented (as in the case where the participants may be sitting one behind the other). In such a case, the image can be cropped to the height of the rectangle, and the width of the image can be adjusted to match the aspect ratio. In such a scenario, the image 101 can be cropped along the perimeter of a rectangle having bottom left pixel coordinates as: [i, (j+l)/2−(k−l)AR/2], and the top right pixel coordinates as: [k, (j+l)/2+(k−l)AR/2]. This produces an image with the ROIs centered horizontally.

Another way of maximizing the proportion of the ROI in an image can be by adjusting the camera's pan-tilt-zoom controls such that the ROI occupy maximum possible area/pixels within a frame captured by the camera. For example, the image 107 shown in FIG. 8 can also be obtained by zooming the camera 310 to the extent that regions 402, 403, and 404 occupy maximum area for the given aspect ratio of the image.

The proportion of the ROI in image 107 can be increased further by carrying out geometric background compression. In geometric background compression, portions of the image that do not belong to the ROI are compressed to a smaller size. By applying geometric background compression to a region, the CPU 313 can reduce the spatial dimensions of the region while at the same time retaining most of the visual information within the region. Geometric compression is unlike cropping, in which visual information within some portions of a cropped region may be completely discarded. CPU 313 may identify one or more portions of the background for compression. The geometric background compression results in the ROI occupying a larger proportion of the image. Consequently, when a background compressed image is displayed, the ROI are larger and easier to view. Because the background compressed image is smaller in size as compared to the original image, the background compressed image may advantageously require a reduced amount of down-sampling and/or video compression for transmission or storage. Even if no down-sampling is performed, the smaller background compressed image would advantageously require less bandwidth than that required by the original image.

Figure 9:
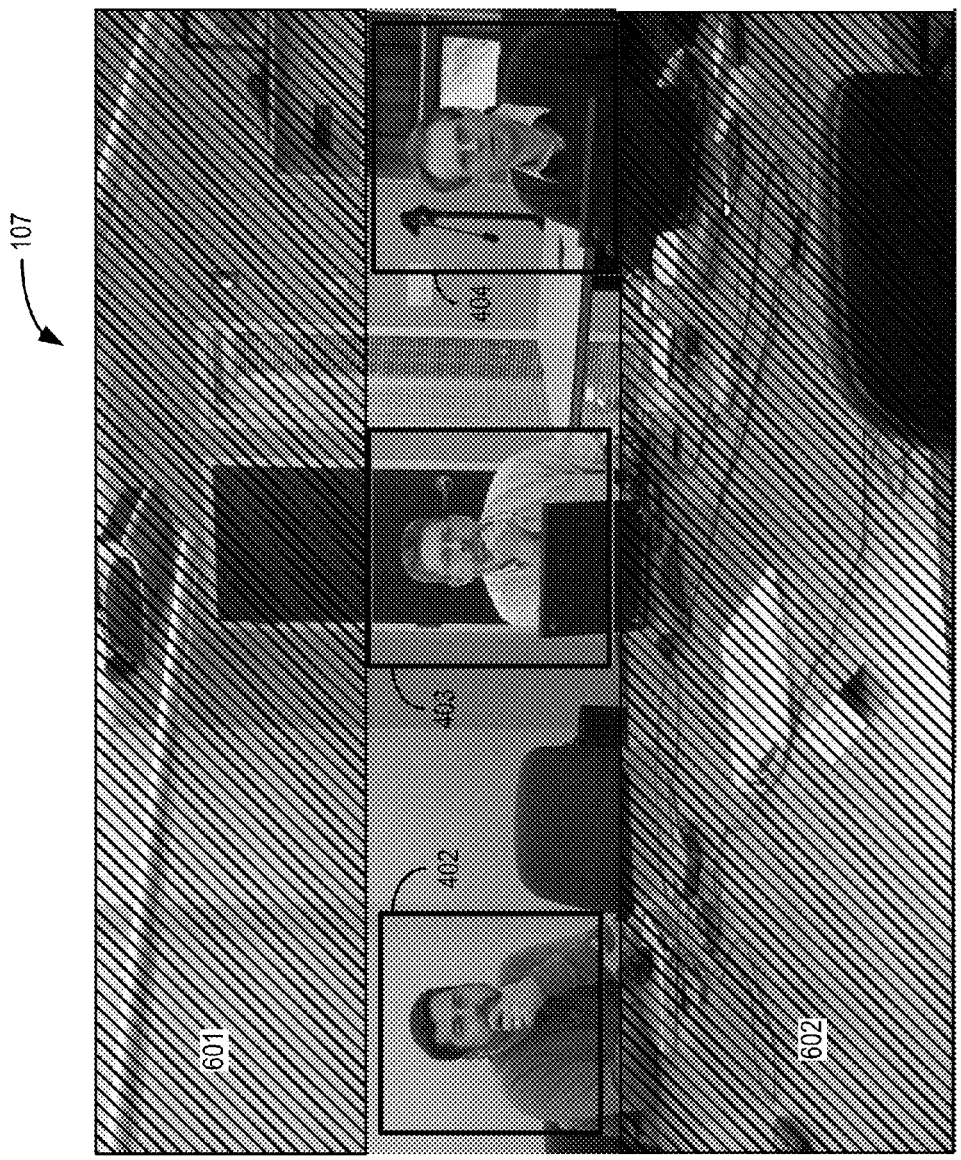
FIG. 9 shows exemplary horizontal background compressible regions of the image of FIG. 8.

Referring to FIG. 8, all regions of image 107, except the ROI 402, 403, and 404, can be considered as background and can be potentially geometrically compressed. For example, as shown in FIG. 9, two horizontal regions 601 and 602 can be identified for compression. One way of determining horizontal regions 601 and 602 is by determining all the rows of pixels in image 107 that do not intersect any of the ROI 402, 403, and 404.

Figure 10:
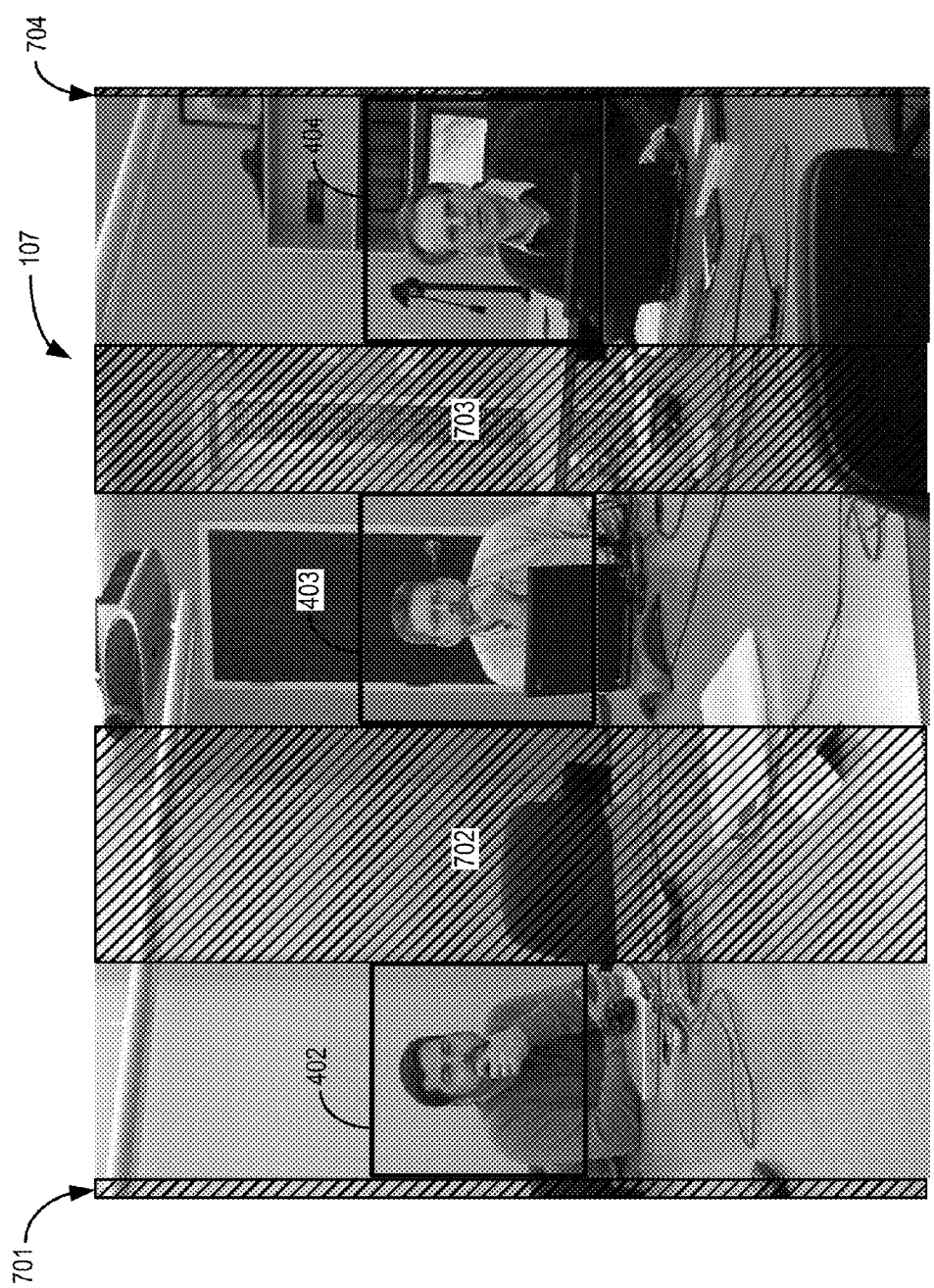
FIG. 10 shows exemplary vertical background compressible regions of the image of FIG. 8.

While FIG. 9 showed determining horizontal background regions, FIG. 10 shows determining vertical background regions. For example, FIG. 10 shows vertical background regions 701, 702, 703, and 704. The vertical background regions can be determined, for example, by determining those columns of pixels that do not intersect with any region of interest 402, 403, and 404. The vertical and horizontal regions of FIGS. 9 and 10 capture most of the background region of image 107. But due to the relative positions of the ROI 402, 403, and 404, some background regions may not be captured. Such un-captured background regions would not be geometrically compressed. Thus, the horizontal and vertical regions identified in FIGS. 9 and 10 can also be referred to as horizontal and vertical compressible background regions.

Figure 11:
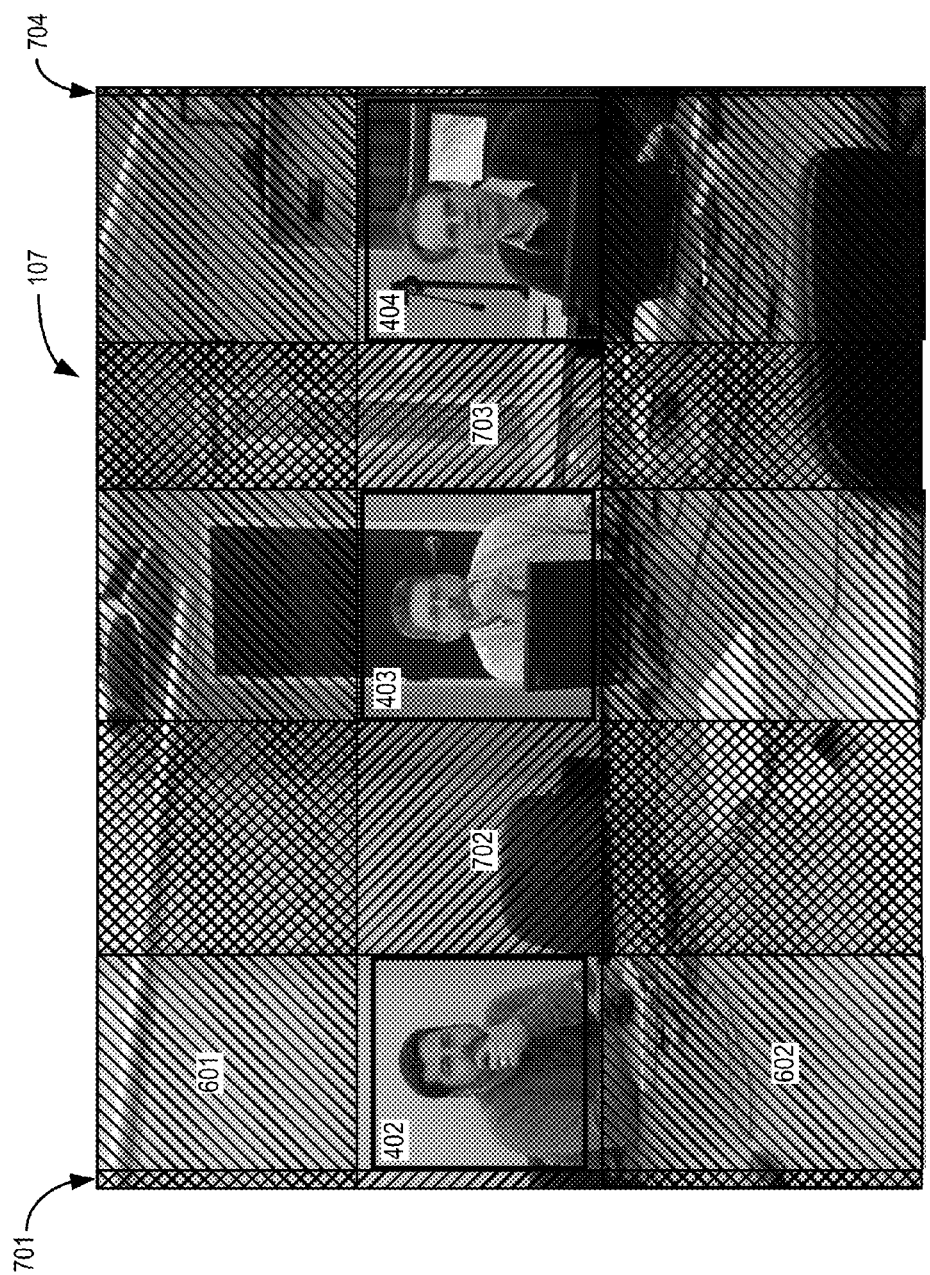
FIG. 11 shows combined horizontal and vertical background compressible regions of the image of FIG. 8.

An aggregate compressible background region of image 107 can be obtained by combining the horizontal background regions and the vertical background regions, as shown in FIG. 11. Image 107 can be compressed vertically in the vertical background regions and horizontally in the horizontal background regions. Regions of image 107 that lie within both a vertical and a horizontal background region can be compressed both horizontally and vertically.

In one example, the compression ratio used to compress the horizontal and vertical background regions can be a function of the target aspect ratio of the output image (which often, but not always, will be the same as the aspect ratio of the input image). The target aspect ratio, as may be recalled, is the aspect ratio of the final image that is transmitted or stored. To determine the compression ratio, a set of variables can be defined as follows:

TABLE 1

| Variable | Description |
| --- | --- |
| V | The proportion of the height of the image covered by horizontal compressible background regions. |
| H | The proportion of the width of the image covered by vertical compressible background regions. |
| AR | Target aspect ratio. |
| M | Maximum compression ratio considered visually acceptable to avoid objectionable distortion from compression of background. |
| CV | Compression ratio in the vertical direction. |
| CH | Compression ratio in the horizontal direction. |

If V>H, i.e., the proportion of the height of the image covered by horizontal compressible background regions (e.g., horizontal regions 601 and 602) is greater than the proportion of the width of the image covered by vertical compressible background regions (e.g., vertical regions 701, 702, 703, and 704) therefore the horizontal compressible background regions can be compressed with maximum compression ratio M (i.e., CH=M). Then, in order to maintain the target aspect ratio AR, the vertical compressible background regions can be compressed by the compression ratio CV=V/((H−H/M)*AR).

Similarly, if V<=H, the vertical compressible background regions can be compressed with maximum compression ratio M (i.e., CV=M). Then, in order to maintain the target aspect ratio of AR, the horizontal compressible background regions can be compressed by the compression ratio CH=((H−H/M)*AR)/V. Whether V>H or V<=H, the resultant background compressed image will contain the ROI 402-404 centered both horizontally and vertically within the area of the image.

The CPU 313 can use linear compression algorithms, non-linear compression algorithms, or any combination thereof. Note that values CV and CH are averages—the actual amount of compression applied to any sub-region may be equal to CV or CH, or may vary. Variable, non-linear compression, in which sub-regions far from the edges of the compressible region are compressed more than sub-regions close to the edges, may result in a more natural looking image with less obvious artifacts from the background compression. In another example of non-linear compression, sub-regions near the center of a compressible background region are compressed with a larger compression ratio than sub-regions farther away from the center. In the example of FIG. 11, a linear compression algorithm is used which compresses a background region by a fixed ratio in a given direction.

Figure 3:
FIG. 3 illustrates one technique of presenting near end participants of the image of FIG. 1.
Figure 12:
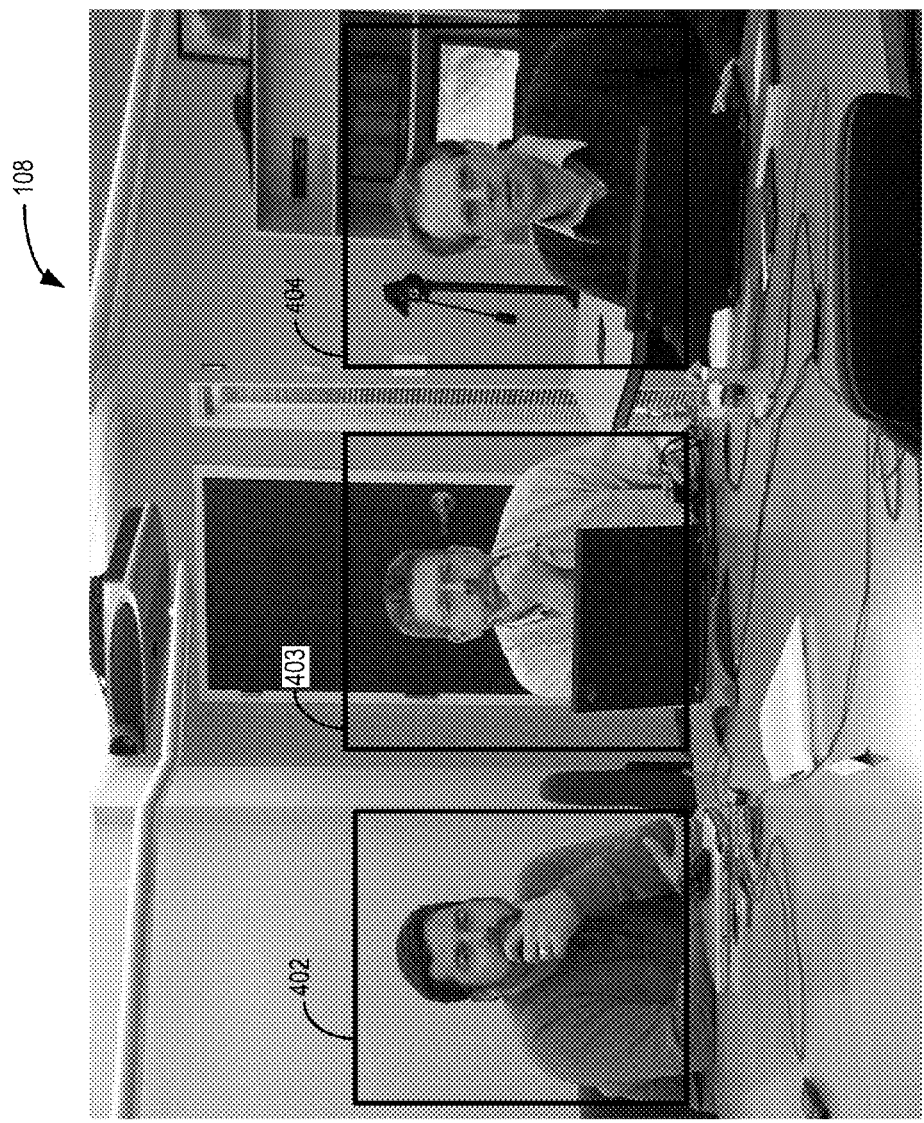
FIG. 12 shows an example of compressing the horizontal and vertical background compressible regions of the image of FIG. 8.

FIG. 12 shows the resultant background compressed image 108 after compression of vertical and horizontal background regions. The proportion of the ROI 402, 403, and 404 within image 108 is considerably increased (compared to the original image 101 of FIG. 1 and image 107 of FIG. 8). The background compressed image 108 preserves the feeling of naturalness, because portions of the original image 101 are not cut out or deleted as was the case in the "Hollywood Squares" method of FIG. 3. While the background portions appear smaller, the relative positions of the ROI are preserved.

In another example, the compression ratio used to compress the horizontal and vertical background regions can be independent of the target aspect ratio AR. In such cases, both the horizontal and vertical background regions can be compressed with maximum compression ratio M (i.e., CH=CV=M). Of course, the resultant background compressed image may have an aspect ratio that is different from the target aspect ratio and may in fact be a function of V and H.

Typically, the background compressed image 108 can be sent to the far end for display, or stored (e.g., in memory 318) for future playback or display. However, some applications my want to reproduce the original image from the background compressed image. This would offer the advantages of improved resolution and detail in the ROI but with no geometric distortions from the background compression process. To provide for this decompression process, the parameters needed to reverse the geometric background compression can be sent with the background compressed image or stored with the stored background compressed image as compression information. In the preferred embodiment, such parameters would include the values of CV and CH listed in Table 1 above for each compressible background region, the method of compression used for each such region (linear, non-linear, etc.), the locations of each horizontal and vertical compressible background region, and the order in which the various background regions were compressed. The configuration information can be concatenated to the image 808 as metadata, or sent in a separately.

To decompress the background compressed image 108, the decompression operations can be carried out in reverse order according to the associated compression information. For example, if horizontal region 601 was compressed last with a linear compression ratio M, making it smaller by a factor of M, then the horizontal region 601 would be decompressed first by making it larger by a factor of M.

Although FIG. 12 shows background compression of a single image 101, it is understood that the CPU 313 can carry out background compression for some or all image frames of a video stream that is transmitted to the far end or stored. The CPU 313 can also determine any changes in the locations of ROI from one image frame to another. For example, if one or more of the participants changes his/her location the ROI can be re-determined. Also if additional participants enter the image frame or one or more participants leave the image frame, the CPU 313 can re-determine the ROI. Accordingly, background regions can also be re-determined, and the cropping and compressing steps can be re-executed to generate the final background compressed image. In other words, the background compressed image for each image frame of a video stream can be dynamically generated.

Note that removal and change of boundaries of the ROI and the compressible background areas, and the change of degree of geometric compression applied to each background area in successive images of a video, are applied in a gradual and moderate way to avoid objectionable artifacts.

The background compressed image frames can be encoded by video codec 317 for transmission to the far end or for compressed storage at the near end (e.g., in memory 318). Video codec 317 may down-sample the background compressed image because of transmission bandwidth constraints. But because the proportion of the ROI in image 108 of FIG. 12 is much larger than that in the original image 101, more details of the ROI will be received than otherwise.

The above description is illustrative and not restrictive. Many variations of the invention will become apparent to those skilled in the art upon review of this disclosure. The scope of the invention should therefore be determined not with reference to the above description, but instead with reference to the appended claims along with their full scope of equivalents.

What is claimed is:

1. A method for videoconferencing between near end and far end videoconferencing or videotelephony units comprising:
   determining one or more regions of interest (ROI) within an image of near end participants;
   determining one or more compressible background regions within the image; and
   geometrically compressing one or more compressible background regions outside of the one or more ROI such that the compressing increases a proportion of area of the one or more ROI within the image to form a background compressed image.

2. The method of claim 1, wherein the one or more ROI comprise images of near end participants.

3. The method of claim 1, wherein the one or more ROI comprise images of objects other than the near end participants.

4. The method of claim 1, wherein the one or more ROI are rectangular in shape.

5. The method of claim 1, further comprising cropping the image after determining one or more ROI to an extent that no portion of the one or more ROI is cropped.

6. The method of claim 5, wherein cropping is a function of an aspect ratio of the image.

7. The method of claim 1, wherein compressing substantially centers the one or more ROI within the image.

8. The method of claim 1, wherein compressing employs a linear compression algorithm that uses a fixed compression ratio for each sub-region of the one or more compressible background regions.

9. The method of claim 1, wherein compressing employs a non-linear compression algorithm that uses different compression ratios for at least two sub-regions of the one or more compressible background regions.

10. The method of claim 9, wherein a compression ratio for a first sub-region is greater than a compression ratio for a second sub-region, the second sub-region being farther from the center of the one or more compressible background region than the first sub-region.

11. The method of claim 1, wherein a compression ratio associated with at least one of the one or more compressible background regions is different from a compression associated with another of the one or more compressible background regions.

12. The method of claim 1, wherein the background compressed image has an aspect ratio that is equal to an aspect ratio of the image.

13. The method of claim 1, wherein the background compressed image has an aspect ratio that is equal to a target aspect ratio.

14. The method of claim 1, further comprising determining compression information, the compression information including location information, compression ratio, compression method, and order of compression associated with each of the one or more compressible background regions.

15. The method of claim 14, further comprising transmitting the background compressed image along with compression information to the far end videoconferencing unit.

16. The method of claim 14, further comprising transmitting the background compressed image separately from compression information to the far end videoconferencing unit.

17. The method of claim 14, further comprising storing the background compressed image along with compression information at the near end videoconferencing unit.

18. The method of claim 1, further comprising:
receiving a background compressed image, the background compressed image including one or more ROI and one or more compressed background regions;
accessing compression information associated with the background compressed image, the compression information including location information, compression ratio, compression method, and order of compression associated with each of the one or more compressed background regions; and
decompressing the one or more far end compressed background regions based on the associated compression parameters to form a far end decompressed image.

19. The method of claim 18, further comprising displaying the decompressed image.

20. The method of claim 18, wherein the compression information is received along with the associated background compressed image.

21. The method of claim 18, wherein the compression information is available before receiving the associated background compressed image.

22. A near end videoconferencing unit communicably coupled to a far end videoconferencing unit, comprising:
a processor configured to:
determine one or more regions of interest (ROI) within an image of one or more near end participants;
determine one or more compressible background regions within the image; and
geometrically compress one or more compressible background regions outside of the one or more ROI such that the compression increases a proportion of area of the one or more ROI within the image to form a background compressed image.

23. The near end videoconference unit of claim 22, further comprising a camera communicably coupled to the processor, wherein the image is supplied by the camera.

24. The near end videoconferencing unit of claim 22, further comprising a memory communicably coupled to the processor, the memory storing the image, and the processor is further configured to access the image from the memory.

25. The near end videoconferencing unit of claim 22, wherein the one or more ROI comprise faces of the one or more near end participants.

26. The near end videoconferencing unit of claim 22, wherein the one or more ROI are rectangular in shape.

27. The near end videoconferencing unit of claim 22, wherein the processor is further configured to crop the image after determining one or more ROI to an extent that no portion of the one or more ROI is cropped.

28. The near end videoconferencing unit of claim 27, wherein the processor is configured to crop the image based on an aspect ratio of the image.

29. The near end videoconferencing unit of claim 22, wherein the one or more ROI are substantially centered within the background compressed image.

30. The near end videoconferencing unit of claim 22, wherein the processor is configured to compress the one or more compressible background regions employing a linear compression algorithm that uses a fixed compression ratio for each sub-region of the one or more compressible background regions.

31. The near end videoconferencing unit of claim 22, wherein the processor is configured to compress the one or more compressible background regions employing a non-linear compression algorithm that uses different compression ratios for at least two sub-regions of the one or more compressible background regions.

32. The near end videoconferencing unit of claim 22, wherein the processor is configured to compress at least one of the one or more compressible background regions with a compression ratio that is different from a compression ratio associated with another one of the one or more compressible background regions.

33. The near end videoconferencing unit of claim 22, wherein the background compressed image has an aspect ratio that is equal to an aspect ratio of the image.

34. The near end videoconferencing unit of claim 22, wherein the processor is further configured to determine compression information, the compression information including location information, compression ratio, and order of compression associated with each of the one or more compressed compressible background regions.

35. The near end videoconferencing unit of claim 34, wherein the processor is further configured to transmit the background compressed image along with compression information to the far end videoconferencing unit.

36. The near end videoconferencing unit of claim of claim 34, further comprising a memory coupled to the processor, wherein the processor is further configured to store the background compressed image along with compression information in the memory.

37. The near end videoconferencing unit of claim 22, further comprising a display device coupled to the processor, wherein the processor is further configured to:
- receive a far end background compressed image and associated compression information, the far end background compressed image including one or more far end ROI and one or more far end compressed background regions, the compression information including location information, compression ratio, and order of compression associated with each of one or more compressed background regions; and
- geometrically decompress the one or more far end compressed background regions based on the associated compression information to form a far end decompressed image.

38. The near end videoconferencing unit of claim 37, wherein the processor is further configured to send the far end decompressed image to the display device.

* * * * *